United States Patent [19]
Wojcik

[11] 3,865,483
[45] Feb. 11, 1975

[54] ALIGNMENT ILLUMINATION SYSTEM

[75] Inventor: Walter J. Wojcik, Poughkeepsie, N.Y.

[73] Assignee: International Business Machines Corp., Armonk, N.Y.

[22] Filed: Mar. 21, 1974

[21] Appl. No.: 453,235

[52] U.S. Cl. .................... 355/43, 250/201, 250/548, 355/53, 356/152, 356/167, 356/169, 356/172

[51] Int. Cl.. G01b 11/26, G03b 27/52, G03b 27/70

[58] Field of Search ............. 355/43, 45, 53, 18, 66, 355/79, 86, 95; 356/114, 119, 152, 138, 153, 167, 169, 172; 250/237, 548, 201

[56] References Cited

UNITED STATES PATENTS

| | | | |
|---|---|---|---|
| 3,476,476 | 11/1969 | Chitayat | 355/86 UX |
| 3,482,107 | 12/1969 | Hock | 356/169 X |
| 3,612,698 | 10/1971 | Mathisen | 356/152 X |
| 3,614,456 | 10/1971 | Hamisch | 250/548 X |
| 3,632,215 | 1/1972 | Holtz | 356/172 X |
| 3,645,626 | 2/1972 | Druschel | 356/167 X |
| 3,648,055 | 3/1972 | DeLang | 356/170 X |
| 3,698,808 | 10/1972 | Delmas | 355/45 |
| 3,712,740 | 1/1973 | Hennings | 356/152 |
| 3,756,723 | 9/1973 | Hock | 356/169 X |
| 3,796,497 | 3/1974 | Mathisen et al. | 356/152 |

*Primary Examiner*—Richard A. Wintercorn
*Attorney, Agent, or Firm*—David M. Bunnell

[57] ABSTRACT

The illumination optics for a dual channel electrooptical alignment system include crossed cylinder lenses to provide beams of light having elliptical cross sections and polarizers to pass only light properly polarized for each channel.

9 Claims, 4 Drawing Figures

ALIGNMENT ILLUMINATION SYSTEM

BACKGROUND OF THE INVENTION

This invention relates generally to electro-optical alignment systems and more particularly to an illumination system for producing images of objects for the purpose of aligning the objects with respect to one another.

Alignment systems for aligning two or more objects with respect to one another employ optic systems which produce an image of the objects or portions thereof in a manner such that the relative position of the objects can be either visually or automatically determined. The relative position of the objects is then adjusted until the desired alignment is achieved. In automatic, computer controlled manufacturing processes using such optical alignment systems, detectors are employed which generate electrical signals based on light information received from the optic system. For automatic alignment the quality of light information received becomes critical. This is particularly true when processing a large number of different articles where features such as alignment marks may vary both in quality and location.

One field requiring very exact alignment of objects is the manufacture of integrated circuits, particularly the alignment of pattern masks with photoresist coated semiconductor wafers for resist exposure, or the placement of semicoductor chips on the conductive pads of supporting substrates.

An example of alignment systems suitable for use in integrated circuit manufacture is described in application U.S. Ser. No. 203,736, filed Dec. 1, 1971, now U.S. Pat. No. 3,796,497 entitled "Optical Alignment Method and Apparatus." In this system two objects are aligned by illuminating two spaced apart alignment target areas on each object, which target areas contain corresponding alignment marks. The alignment marks are scanned past a photo detector which generates signals indicative of the location of the marks. The size of the objects and/or the location of the marks may vary. Ordinarily this would require some movement of the alignment optical system to illuminate the shifting target areas or an alignment beam of a size large enough to accomodate the shifting targets. The former solution requires moving parts which must be adjusted in order to accomodate different target locations. The latter solution results in inefficient use of the light, even if light of sufficient intensity could be generated to cover all the possible target area positions. It is also necessary in automatic systems to avoid cross talk of light between alignment channels such as may be caused by surface reflections off the elements of the optic system. This interfering light can cause the photo detector to generate false signals and make alignment difficult or impossible. It is also desirable to provide a system which will give equal intensity light for each channel while using a single illumination source.

BRIEF SUMMARY OF THE INVENTION

An improved optical illumination system has now been found which provides for full utilization of available light source energy with no need to scan the illumination beams due to object size variation or alignment target shift. The system also reduces errors due to cross talk between illumination channels. In accordance with this invention there is provided an illumination system for an optical alignment apparatus comprising means to form two channels of polarized light which have different directions of polarization and means to make the cross section of the channels elliptical in shape. Means are provided to direct each of the channels to different target areas of a first object which is to be aligned with a second object. A lens means is located in the path of the channels which images the target areas of the first object in the plane of corresponding target areas on the second object. Optical pick up means are provided for each channel. Each pick up means includes a polarizer which passes only the light which is properly polarized for its respective channel.

DESCRIPTION OF THE DRAWINGS

The foregoing and other objects, features and advantages of the invention will be apparent from the following more particular description of a preferred embodiment of the invention as illustrated in the accompanying drawings.

DETAILED DESCRIPTION

Figures 1, 2, 3A:
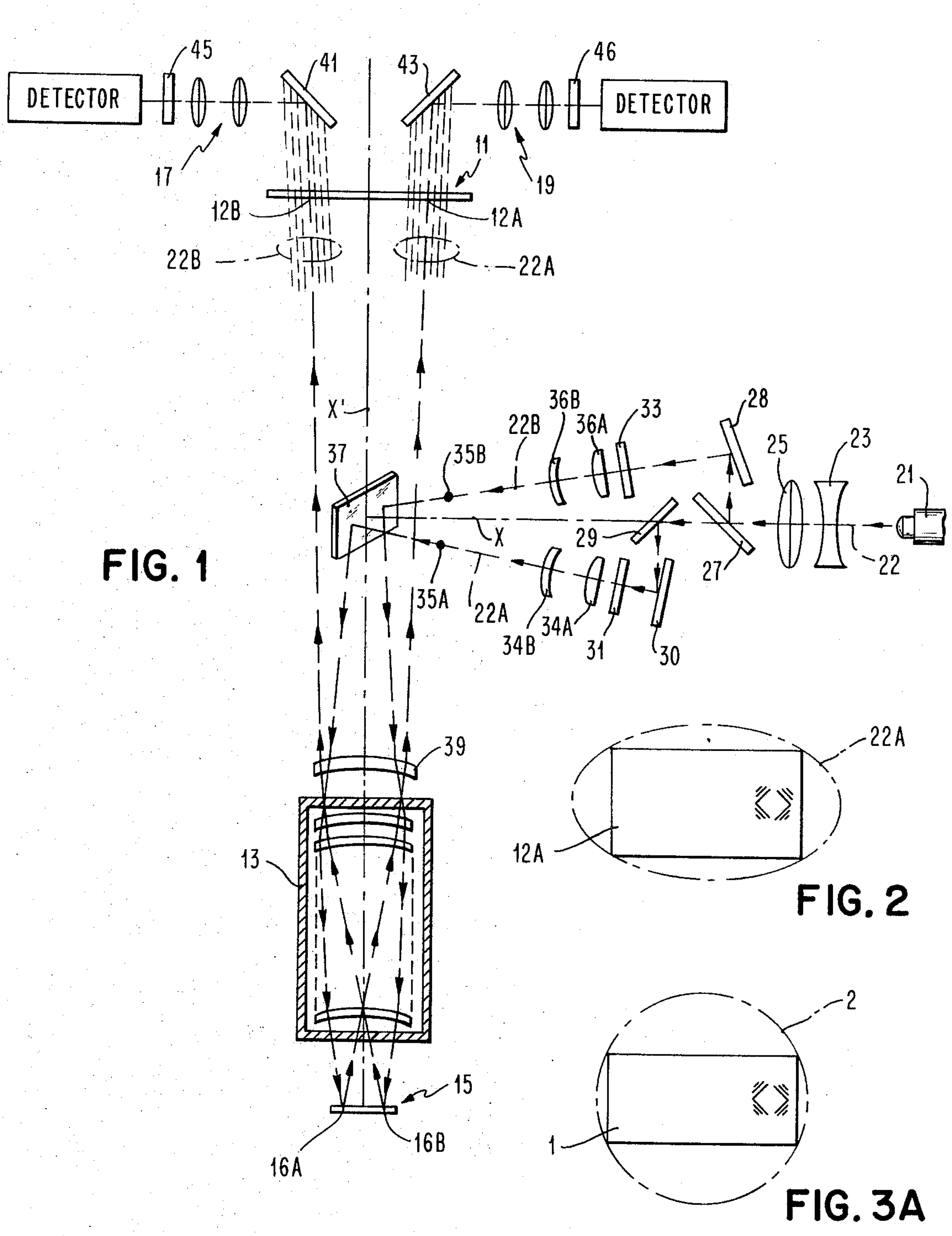
FIG. 1 is a schematic cross sectional view of an embodiment of the invention.
FIG. 2 is a plan view of a target area which is illuminated in accordance with the embodiment of the invention of FIG. 1.
FIGS. 3A and B are plan views of target areas of objects to be aligned illustrating their alignment employing alignment beams having a circular cross section.

Turning now to FIG. 1, an embodiment of the alignment illumination system of the invention is illustrated for use in conjunction with a projection printing apparatus. An integrated circuit mask pattern on mask 11 is arranged to be imaged through a high resolution reduction projection lens 13 onto a layer of light sensitive resist material which is coated on the surface of a semiconductor wafer 15 which is being processed to form integrated circuits. It should be understood that the system is applicable to any process which requires the alignment of objects with respect to one another. Mask 11 and wafer 15 are mounted for relative movement with respect to one another such that patterns located on each object can be aligned using signals generated from corresponding alignment patterns onto spaced rectangular target locations 12A and 12B and 16A and 16B respectively, which are located on mask 11 and wafer 15. The alignment patterns on wafer 15 are imaged in the plane of mask 11 and the images of the patterns on mask 11 and wafer 15 are conveyed by alignment fingers 17 and 19 to a suitable scanning system which produces electrical signals corresponding to the position of the patterns observed by the alignment fingers. The electrical signals can then be used to activate means which will move either mask 11 or wafer 15 or both into alignment. For example, one or both of the objects can be positioned on a X, Y, $\theta$ table which is moved by stepping motors or suitable transducers.

Figure 3B:
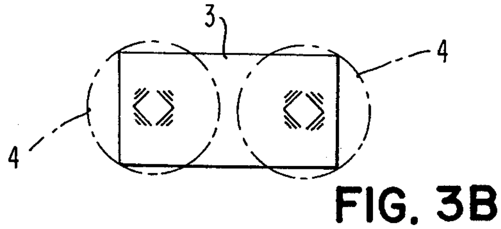

The alignment illumination is provided by a suitable light source. In the embodiment shown, argon laser 21 provides a circular 0.05 inch diameter beam 22 of monochromatic polarized light having a wavelength of 5145 angstroms, which is chosen so that the light does not expose the light sensitive resist during the alignment operation. Beam 22 is expanded by lenses 23 and 25 to a diameter of about 0.16 inch and is then split into two beams 22A and 22B by a beam splitter 27 which, in the embodiment shown, is a plain parallel plate beam splitter having 50—50 nominal transmission-reflection. Beams 22A and 22B are directed at angles of 3.55° to the axis of beam 22 by mirrors 28, 29 and 30. Beam 22A is passed through polarizer 31 which is arranged to be rotated in order to balance the intensity of beams 22A and 22B. Beam 22B is passed through half wave plate 33 which rotates the polarization of beam 22B, an angle of 90° such that the polarization of the beams 22A and 22B are orthogonal. Beams 22A and 22B are then changed from a circular to a elliptical cross section by crossed cylinder lenses 34A, 34B and 36A, 36B respectively. Lenses 34A and 36A have a focal length of 4 inches and lenses 34B and 36B have a focal length of 3 inches with the lenses of each pair being located 1 inch apart so that they have common focal points at 35A and 35B respectively. Beams 22A and 22B are then reflected by full mirror 37, which is located on optical axis X' of the projection printing system between mask 11 and projection lens 31, through an alignment lens 39 and projection lens 13 to the alignment pattern areas 16A and 16B on wafer 15. Lens 39 is a weak positive lens which is used to provide proper focus of the wafer image in the mask plane for light of the illumination wavelength. The lens 39 is needed because lens 13 is carefully adjusted to give proper focus of the mask image on the wafer plane during exposure using light having the proper wave length for resist exposure. The beams are reflected by the wafer surface back through lenses 13 and 39. The separation and angle of beams 22A and 22B to the optical axis X' of the projection system is about 1°. The size of mirror 37 is chosen such that beams 22A and 22B pass on either side of mirror 37 and illuminate the alignment pattern areas 12A and 12B respectively. The location of the crossed cylinder lenses is adjusted such that beams 22A and 22B are collimated as they pass back through lens 13. The beams are then reflected by mirrors 41 and 43 of alignment fingers 17 and 19 into the pickup optics, which are in effect microscopes, which provide a magnified image of the alignment patterns to send to the detectors such as photo cells and/or a TV camera and CRT display. The pickup optics include polarizers 45 and 46 respectively, which pass only light polarized according to that channel. The crossed cylinder lenses provide beams of elliptical cross section. These beams conform better to the shape of the rectangular alignment target area 12A as illustrated in FIG. 2 than would be the case if beams 2 and 4 of having circular cross section are employed in illuminating rectangular target areas 1 and 3 as is illustrated in FIGS. 3A and 3B respectively. The elliptical beams also provide efficient illumination of the entire field with a minimum of unused light. Alignment marks with different locations in the target areas because of either different wafer sizes or target shift, which may occur between different masking levels, can be illuminated without need to change or move the alignment optics. The circular beam as illustrated in FIG. 3A, although illuminating the entire target area results in a very inefficient use of the optical illumination light and would require an illumination source of increased intensity over that required by the system of the invention in order to achieve the same degree of illumination of the target field. The use of smaller circular beams to eliminate different portions of the target area, as illustrated in FIG. 3B, would require means to shift the path of the illumination light beam in order to illuminate the desired portion of the total target area.

The 90° polarization of the beams and the polarizers which are located in the pickup fingers eliminate cross talk of light between channels which may be caused, for example, by unavoidable reflection of light from the surfaces of the lenses 13 and 39 of the projection system which can cause false signals to be generated by the detectors with consequent inability of an automatic alignment system to align mask 11 and wafer 15. The use of mirror 37, which is arranged to intercept and reflect only beams 22A and 22B as they go from the illumination source to wafer 15, provides for the maintenance of maximum light intensity. On the other hand, the use of half silvered mirrors or beam splitters would reduce the light intensity reaching the mask.

While the invention has been particularly shown and described with reference to a preferred embodiment thereof it will be understood by those skilled in the art that various changes in form and details may be made therein without departing from the spirit and scope of the invention.

What is claimed is:

1. An optical illumination system for an optical alignment apparatus comprising:
- means to form two channels of polarized light having different directions of polarization,
- means to make the cross section of said channels elliptical;
- means to direct each of said channels to different areas of a first object which is to be aligned with a second object;
- lens means located in the path of said channels to image said areas of said first object in the plane of corresponding areas on said second object; and
- optical pickup means arranged to view each channel, each pickup means including a polarizer which passes only the light which is properly polarized for its respective channel.

2. An optical illumination system for an optical alignment apparatus comprising:
- means to form a monochromatic polarized beam of light;
- means to form said beam into two channels;
- means to rotate the polarization of one channel with respect to the other;
- means to make the cross sectional shape of said channels elliptical;
- means to direct said elliptically shaped channels to spaced apart target areas on the surface of a first object to be aligned with a second object;
- lens means to cause said channels to image the target areas on said first object in the plane of corresponding target areas on said second object,
- an optical pickup means arranged to view said channels, said pickup means including polarizers which pass only the light which is properly polarized for each channel.

3. In a projection printing apparatus having alignment means including an alignment illumination system to align a pattern mask with respect to a pattern contained on a substrate which is coated with a light sensitive layer, and means including a projection lens to form the image of said mask on said light sensitive layer, the improvement which comprises an alignment illumination system which includes:

a. a light source to provide a beam of polarized light;

b. a beam splitter to divide said beam into two channels;
c. a means to rotate the polarization of a first channel;
d. a polarizer in the path of the second channel for equalizing the intensity of the two channels;
e. a pair of crossed cylinder lenses located in the path of each channel to cause the cross section of the channels to be elliptical;
f. a mirror located on the axis of the projection system between the mask and substrate at an angle to the said axis such that the channels are directed to two spaced apart target locations on the substrate; and
g. optical pickup means for each channel located on the opposite side of said mask from said substrate to receive images of each target location said pickup means including a polarizer which passes only light properly polarized according to its respective channel.

4. The illumination system of claim 2 wherein said means to form a monochromatic polarized beam of light includes an argon laser.

5. The illumination system of claim 2 wherein said means to form said beam into two channels is a parallel plate beamsplitter having a 50—50 nominal transmission-reflection.

6. The illumination system of claim 2 wherein said means to rotate the polarization of one channel with respect to the other is a half wave plate which rotates the polarization an angle of 90°.

7. The illumination system of claim 2 wherein said means to make the cross sectional shape of said channels elliptical includes a pair of crossed cylinder lenses located in the path of each channel.

8. A process for illuminating objects to be aligned by an optical alignment apparatus comprising:

forming two channels of polarized light having different directions of polarization;
making the cross sections of said channels elliptical;
directing each of said channels to different areas of a first object which is to be aligned with a second object;
imaging said areas of said first object in the plane of corresponding areas on said second object; and
viewing only the light which is properly polarized for each channel.

9. The process of claim 8 wherein said first object is a substrate coated with a light sensitive layer and said second object is a pattern mask.

* * * * *